United States Patent Office 2,776,275
Patented Jan. 1, 1957

2,776,275

ROSIN AND ROSIN SIZE STABILIZED AGAINST CRYSTALLIZATION

Edward Strazdins, Stamford, Conn., assignor to American Cyanamid Company, New York, N. Y., a corporation of Maine No Drawing. Application August 2, 1955, Serial No. 526,071

18 Claims. (Cl. 260—97.5)

This is a continuation in part of copending application Serial No. 435,071 filed on June 7, 1954, by Edward Strazdins.

The present invention relates to rosins stabilized against crystallization by a uniformly distributed content of the condensation product of rosin with a saligenin, and to liquid sizes prepared therefrom. The invention includes processes for the manufacture of the stabilized rosins and the liquid sizes. The preferred saligenins are saligenin itself and the mono and dialkyl saligenins.

Rosin is an important article of commerce and is often shipped in tank cars in molten form. Liquid rosin size is likewise an important article of commerce used in the manufacture of paper to render the same water-resistant, and is almost always similarly shipped.

It has long been known that rosins crystallize when maintained in molten condition, and that such crystallization greatly decreases the value of the rosin as a raw material for the manufacture of paper size, the crystals of rosin failing to dissolve during the conversion of the rosin into size and appearing as spots in the paper giving the paper an undesirable appearance and feel. Moreover, such paper has poor printing properties.

It is further known that liquid rosin sizes tend to crystallize during storage or shipment. The onset of crystallization is preceded by no warning, and when crystallization is well advanced the liquid size sets to a nearly solid mass which can be rendered pumpable only by prolonged injection of live steam with addition of strong caustic solution. This is a tedious and costly procedure which, moreover, greatly decreases the value of the size for papermaking purposes.

The reason why molten rosin crystallizes is not known. The particles formed when liquid rosin size crystallizes are generally believed to be water-insoluble double salts consisting of 3 molecules of abietic acid and 1 molecule of an alki metal abietate.

The present invention is based upon the discovery that rosins having a uniformly distributed content of a small amount of the condensation product of a rosin with a saligenin which is soluble in molten rosin are stabilized against crystallization, that is, they crystallize much less readily than the respective rosins containing none of such condensation product. The present invention is further based on the discovery that when these stabilized rosins are formed into liquid sizes, the liquid sizes are similarly stabilized against crystallization. The saligeninated rosin compositions referred to thus consist essentially of a major amount of a rosin and a minor but effective amount of a rosin-saligenin condensate as anti-crystallizing agent therefor, and the sizes are aqueous solutions of the alkali metal soaps of the rosin compositions. Since the amount of alkali employed in converting rosin compositions into soaps may be equal to or less than the stoichiometric, the sizes of the present invention are defined as liquid rosin sizes containing a small amount of a material selected from the group consisting of the rosin-saligenin condensates and their alkali metal salts.

The preferred liquid sizes of the present invention possess the following principal advantages.

1. They are prepared in the same manner as ordinary rosin size.

2. They are employed in the manufacture of paper in the same manner as ordinary rosin size.

3. They impart about the same resistance to water and somewhat better resistance to ink and to lactic acid than corresponding rosin sizes which have not been so stabilized.

The principal commercial rosins employed for the manufacture of paper size are gum rosin, wood rosin, and the comparatively new tall oil rosin which is the rosin remaining after removal of the fatty acids from tall oil by fractional distillation, and for which standards have been promulgated by the U. S. Department of Agriculture. There has still more recently come on the market a new type of rosin termed "fortified rosin," such rosin being manufactured by heating rosin with a small amount (typically $\frac{1}{12}$ to $\frac{1}{5}$ mol per mol of rosin) of an unsaturated acid anhydride such as maleic, itaconic or citraconic anhydride to a temperature sufficiently high to cause the unsaturated acid anhydride to form a Diels-Alder adduct with the rosin. The product is thus essentially rosin containing a small amount of the adduct, and is made into a size in the same manner as ordinary rosin. The foregoing rosins and liquid sizes prepared therefrom show a tendency to crystallize and thus fall within the class of materials which are advantageously treated according to the present invention.

Formation of crystals in these materials depends on numerous independent variables.

In the case of molten rosin, crystallization is principally a function of the temperature at which it is stored, the duration of the storage, the presence therein of finely-divided material capable of acting as a seeding agent for the crystallization, and the type of rosin employed. Crystallization is favored by higher storage temperatures, reaching a maximum at about 110° C. Tall oil and wood rosins are particularly prone to crystallize, whereas gum rosin is more stable in that regard.

This tendency to crystallize is carried over to the liquid sizes prepared from the respective rosins, the liquid sizes prepared from tall oil or wood rosin crystallizing quite rapidly, whereas liquid sizes made from gum rosin crystallizing at a slower rate. Higher temperatures favor crystallization. An important factor is the solids content of the size and the amount of free rosin acids present therein, high solids, high free rosin sizes, that is, sizes containing about 70% of sizing solids and 20% to 30% of free rosin acids being the most prone to crystallize.

As a result, the minimum effective amount of the condensation product which should be present to prevent crystallization is best determined in each case by making the usual routine laboratory trials as shown in the examples below. In practice, the presence of sufficient condensate corresponding to that formed by reacting $\frac{1}{40}$ of a mol of the saligenin with 1 mol of the rosin will stabilize rosins such as gum rosin or gum rosin liquid size for most commercial purposes, and not more than about $\frac{1}{4}$ mol of the saligenin need be reacted per mol of rosin to stabilize even those rosins and liquid rosin sizes which are most prone to crystallization. These amounts are equivalent to about 1% to 10% of the weight of the rosin. An excess of the condensate over the minimum effective amount does no harm, and I therefore prefer to have present the amount formed by reacting from roughly 1/10 to roughly 1/5 mol of the saligenin per mol of rosin, this amount being sufficient to stabilize most of the commercial rosins and liquid rosin sizes for average periods of storage at normal storage temperatures.

Broadly, the rosin compositions of the present invention are most advantageously prepared by condensing the rosin in molten form with a small amount of the appropriate saligenin, that is, by heating the two together at a reaction temperature below that at which esterification takes place (ca. 250° C.) until evolution of water has substantially ceased, indicative of substantially complete condensation of the saligenin with the rosin. The amount of saligenin being small as compared with the amount of rosin, the saligenin appears to react preferentially with those rosin acids in the composition primarily responsible for the formation of crystals.

The condensation is most advantageously effected in the temperature range of 150°–200° C., this temperature range ensuring that the amount of esterification taking place is negligibly small as evidenced by comparison of the acid number of the rosin employed with the corrected acid number of the condensate obtained. Because of the small amount of saligenin added the reaction proceeds quite rapidly.

Upon completion of the condensation reaction the product may be converted into a liquid size by reaction with aqueous alkali solution containing sufficient water and alkali such as sodium hydroxide or sodium carbonate to form a liquid size of the desired solids and free acids content. The particular manner in which the condensation product is converted into a liquid size and the amount of water or alkali employed is not a feature of the present invention.

The stabilized rosins and rosin sizes of the present invention may be prepared in a number of other ways. For example, a large amount of the saligenin may be condensed with the rosin to form a master batch which can be diluted with ordinary rosin. The mixture may then be reacted with aqueous alkali in the usual manner to form a liquid size therefrom.

Alternatively, the master batch may be reacted with aqueous alkali and the size thus produced may be blended with separately-prepared ordinary liquid rosin size, again so as to form a composite liquid size containing about the minimum effective amount of the condensation product. In either way the liquid size has a well distributed content of the condensation product, but best stabilization is effected in terms of the amount of saligenin used when the first mentioned procedure is employed.

Since the acid number of the rosin during the condensation does not materially decrease, the condensation is best explained in terms of a theoretical equation such as the following in which abietic acid exemplifies the rosin and saligenin exemplifies the saligenin employed.

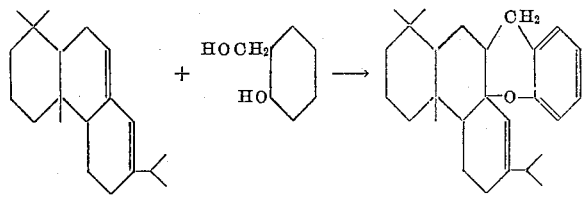

The condensation, however, may take place at a different point in the molecule and, moreover, the position of the OH and CH2OH groups of the saligenin may be reversed during the condensation. Furthermore, commercial rosins are mixtures of a large number of rosin acids of which only a part is abietic acid. The products are therefore best defined by their method of preparation.

The compounds which contain an aryl nucleus carrying a hydroxy group and a hydroxymethyl group in adjacent relationship, e. g.

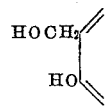

are generically known as saligenins. The term includes saligenin itself (o-hydroxybenzyl alcohol), the alkyl saligenins derived from phenol carrying one or more alkyl substituents attached directly to the ring, the aryl saligenins derived from the phenyl-phenols, the alkyl aryl saligenins, the halogen saligenins wherein the chlorine may be attached to the saligenin nucleus or to aryl or alkyl groups attached thereto, the aminosaligenins, the nitrosaligenins, the formyl acetyl, propionyl saligenins, the carboxy and sulfo saligenins and esters thereof, the acetamido saligenins, the mixtures of the foregoing saligenins and polymers thereof.

The evidence indicates that it is sufficient if the compound be a saligenin which is soluble in molten rosin, and that the identity of any substituents present is of such minor importance as not to be a principal feature of the invention.

The invention will be further described by the examples which follow. It will be understood that the examples represent specific embodiments of the invention and are not to be construed in limitation thereon.

*Example 1*

A number of saligenins were prepared according to the following general method.

94 g. (1.0 mol) of a suitable phenol was placed in a reaction flask and heated to 70°–90° C. There was then added 21.6 g. of water containing 6 g. (0.15 mol) of NaOH and finally formaldehyde (as paraformaldehyde) in amount shown in the table below. An exothermic reaction took place and the temperature was maintained at 70°–90° C. by cooling to minimize self-condensation of the methylol groups thus introduced. The exotherm ceased in 15–20 minutes and the products were maintained at that temperature for an additional 15 minutes to ensure complete reaction of all of the formaldehyde. The products were then cooled to room temperature at which they were slightly viscous yellow solutions which were soluble in water. For purposes of comparison a quantity of chemically pure saligenin itself was obtained. This saligenin is shown as No. 1 in the table.

| No. | Phenol | | $CH_2O$, Mols | Product |
|---|---|---|---|---|
| | Name | Mols | | |
| 1 | | | | Saligenin, reagent grade. |
| 2 | Phenol | 1.0 | 1.0 | Saligenin, crude. |
| 3 | do | 1.0 | 1.2 | Do. |
| 4 | p-(Branched chain octyl) phenol. | 1.0 | 1.5 | p-(Branched chain octyl) saligenin. |
| 5 | o, m, p-(Branched chain nonyl) phenols (mixt.) | 1.0 | 1.5 | o, m, p-(Branched chain nonyl) saligenins (mixture). |

*Example 2*

A series of stabilized rosins of the present invention were prepared by the following method.

100 parts of rosin as shown in the table below were heated to 170° C. in a reaction flask fitted with stirrer, thermometer, CO2 inlet tube, and water trap. To this was added a saligenin of Example 1 in the amount shown in the table below. A condensation reaction took place releasing water which was swept out of the reaction vessel by the carbon dioxide admitted. When formation of water ceased (which usually required about 1 hour) the reaction mixture was cooled to about 150° C., a sample removed, and the remainder slowly poured into sufficient aqueous caustic of about 20% strength to yield sizes of the solids content and free abietic acid content described. During the condensation no esterifictaion took place as evidenced by a comparison of the acid value of the rosin before and after condensation, allowance being made for any NaOH present.

The tall oil, wood and gum rosins used were the natural products which had not been isomerized or otherwise treated except as stated in the table. The fortified rosins were made by reacting the rosins shown in the table with 5% of their weight of maleic anhydride at 175° C.

The condensation products and the liquid sizes prepared therefrom were subjected to standard laboratory tests to determine their resistance to crystallization as follows. Each of the condensation products was subjected to an accelerated test by melting 50 g. thereof and pouring the viscous material into a small bottle and stirring in a trace (about 0.1 g. or less) of finely-ground rosin which had previously been crystallized. From previous experience it is known that this particular rosin acts as a very effective seeding agent for promoting crystallization. The bottle was then stoppered, incubated for 24 hours at 110° C., this temperature being more than sufficient to maintain the rosin molten (and examined for crystallization). Crystallization is evidenced by transformation of the originally clear rosin into a cloudy mass. The extent of crystallization is estimated visually by comparing the sample with a standard known to have crystallized substantially completely.

The liquid sizes were tested by incubating 50 g. samples in stoppered bottles for 40 days at 70° C. without addition of seeding agent, this test being more vigorous than required by commercial practice, the period of incubation being longer than the average life of commercial rosin sizes and the temperature being higher than that to which rosin size is normally subjected during storage and shipment. Crystallization was determined at the end of the test by microscope examination of a smear of the size on a glass slide. The crystal population in the field was expressed as a percentage of the crystal population of a size of the same solids content known to be substantially completely crystalilzed, and observed under the same conditions. Crystallization values greater than 5%–10% in the case of rosin, and any crystallization value in the case of liquid rosin size is considered to designate the material as commercially unacceptable. Results are as follows.

| Run No. | Rosin | Saligenin | | Composition of Size | | Percent Crystallization | |
|---|---|---|---|---|---|---|---|
| | | No.[1] | Mols[2] | Percent Solids[3] | Percent F. A.[4] | Molten Rosin[5] | Liquid Size[6] |
| 1 | Tall oil, S grade | | | 70 | 27 | 100 | >50 |
| 2 | ---do--- | 2 | 0.12 | 70 | 27 | 0 | 0 |
| 3 | ---do--- | 3 | 0.12 | 70 | 27 | 0 | 0 |
| 4 | ---do--- | 4 | 0.06 | 70 | 27 | 20 | 0 |
| 5 | ---do--- | 5 | 0.06 | 70 | 27 | 10 | 0 |
| 6 | Tall oil, D grade | | | 70 | 30 | 100 | >50 |
| 7 | ---do--- | 1 | 0.12 | 70 | 30 | 0 | 0 |
| 8 | ---do--- | 2 | 0.12 | 70 | 30 | 0 | 0 |
| 9 | ---do--- | 2 | 0.20 | 70 | 30 | 0 | 0 |
| 10 | Wood | | | 70 | 27 | 100 | >50 |
| 11 | ---do--- | 3 | 0.12 | 70 | 27 | 0 | 0 |
| 12 | ---do--- | 3 | 0.06 | 70 | 27 | 20 | 0 |
| 13 | Gum | | | 70 | 27 | 80 | 40 |
| 14 | ---do--- | 2 | 0.12 | 70 | 27 | 0 | 0 |
| 15 | ---do--- | 2 | 0.04 | 70 | 27 | 0 | 0 |
| 16 | Fortified tall oil, S grade | | | 70 | 27 | 30 | 20 |
| 17 | ---do--- | 2 | 0.12 | 70 | 27 | 0 | 0 |
| 18 | ---do--- | 3 | 0.12 | 70 | 27 | 0 | 0 |
| 19 | Fortified tall oil, D grade | | | 70 | 27 | 90 | 50 |
| 20 | ---do--- | 2 | 0.12 | 70 | 30 | 0 | 0 |
| 21 | Fortified wood | | | 70 | 27 | 50 | 30 |
| 22 | ---do--- | 2 | 0.12 | 70 | 30 | 0 | 0 |

[1] For composition of saligenin see table of Example 1.
[2] Mols saligenin reacted per mol of rosin.
[3] Size solids on total weight of size.
[4] Free acid calculated as abietic acid.
[5] After 24 hours of incubation at 110° C.
[6] After 40 days of incubation at 70° C.

In the table, runs 1, 6, 10, 16, 19, and 21 are control runs illustrating the crystallization which the principal rosins and rosin sizes prepared therefrom undergo. The remaining runs were made according to the present invention. In every case the reaction of 0.12 mol of the saligenin was sufficient to prevent crystallization both of the rosin and the liquid size.

It frequently happens that rosin is not stored in molten form but is immediately converted into liquid size. Runs 4, 5, and 12 show that in such event the amount of the saligenin may be considerably decreased.

*Example 3*

Sizes corresponding to several of the foregoing sizes were tested to determine their effectiveness in imparting water-resistance, ink resistance and lactic acid resistance to paper in comparison to the results obtained by use of their parent rosins. The sizes were prepared at 70% solids and 16% free acid content, and were applied according to the following general procedure.

A beaten 60% bleached sulfite and 40% bleached soda pulp furnish was diluted to 0.6% consistency. To samples of this furnish was added 2% of the size (sizing solids based on the dry weight of the fibers) followed by 2% of alum based on the dry weight of the fibers. After the size had set on the fibers the fibers were sheeted on a British handsheet machine and the sheets dried for 1 minute at 240° F. The sheets were tested for their water-resistance by the total immersion method (15 minutes at 20° C.), for their ink-resistance by the photocell method, and for their lactic acid-resistance by penescope using a 20% lactic acid solution. Results are as follows.

| No.[1] | Size | | $H_2O$ Absorbn., Percent | Ink Penetration, Sec. | Lactic Acid Penetration, Sec. |
|---|---|---|---|---|---|
| | Rosin | Saligenin, Mols | | | |
| 1 | Tall oil, S grade | | 36.0 | 400 | 200 |
| 2 | ---do--- | 0.12 | 35.1 | 455 | 220 |
| 6 | Tall oil, D grade | | 36.7 | 450 | 220 |
| 8 | ---do--- | 0.12 | 36.4 | 525 | 250 |
| 10 | Wood | | 35.7 | 440 | 170 |
| 11 | ---do--- | 0.12 | 34.1 | 470 | 235 |

[1] Sizes correspond to like-numbered sizes of table of Example 2.

The results indicate that the sizes of the present invention give slightly better results than sizes prepared from their parent rosins.

*Example 4*

To 39 g. (0.197 mol) of p-α-phenethylphenol was added 1.2 g. of NaOH dissolved in 4.3 g. of water. The mixture was heated to 70° C. and 6.3 g. of 95% paraformaldehyde (0.197 mol) was added in small increments. The reaction was substantially complete at the end of 30 minutes, resulting in formation of a solution of the methylol derivative of the phenol.

500 g. (1.65 mol) of S grade tall oil rosin (acid number 167) was heated to 170° C., the methylolated p-α-phenethylphenol solution slowly added with agitation, and the temperature of the mixture maintained at 210° C. for 1 hour. The product was then cooled. The acid number of the stabilized rosin thus prepared was 154. Calculations showed that substantially no esterification took place.

*Example 5* p-t-Butyl-o-cresol was methylolated by the procedure of Example 4 employing 32.4 g. (0.197 mol) of the cresol and the same amounts of the other materials being used. The resulting methylolated phenol was reacted with 500 g. of S grade tall oil rosin also according to Example 4.

The acid number of the stabilized rosin thus prepared was 155.

*Example 6*

24.1 g. (0.197 mol) of 2,4-xylenol was methylolated according to Example 4 using the same amounts of other materials. The reaction product was reacted with 500 g. of S grade tall oil rosin in the same manner as Example 4. The acid number of the stabilized rosin thus prepared was 159.

*Example 7*

The stabilized tall oil rosins of Examples 4, 5, and 6 were tested for crystallization by heating the rosins to melting, pouring 2 ounces of each into vials, adding a small pinch of powdered crystallized rosin as seeding agent, stoppering the vials and incubating the vials at 110° C. for 24 hours. The stabilized rosin of Example 5 exhibited no crystallization whatever and the stabilized rosins of Examples 4 and 6 showed a negligible trace. All were fully suitable for commercial use.

The three stabilized rosins were converted into high free rosin liquid sizes (70% size solids and 27% free acid) and samples were incubated for 40 days at 70° C. At the end of this time, the samples were examined under a microscope and no evidence of crystallization was found.

*Example 8*

A variety of saligenins suitable for the practice of the present invention were prepared as follows.

Five of the saligenins Nos. 6–10 in the table below were prepared in accordance with the method of Example 1. Four (saligenins Nos. 11–14) were prepared by the method of Example 1 modified in two respects. First, formalin was employed as the source of formaldehyde. Secondly, the pH of the reaction mixture was continuously followed and was maintained alkaline (pH 10–12) by addition of concentrated sodium hydroxide as necessary.

In the case of saligenins Nos. 6–14 one mol of the phenol was reacted with one mol of formaldehyde. In each instance the reaction went to practical completion with formation of a monomer or essentially monomeric condensate, and frequently some unreacted formaldehyde remained. The products were aqueous syrups. The following shows in each instance the phenols employed and the products obtained.

| No. | Phenol Used | Product Obtained |
|---|---|---|
| 6 | p-Chlorophenol | 4-Chlorosaligenin. |
| 7 | p-Methoxyphenol | 4-Methoxysaligenin. |
| 8 | p-Carbethoxyphenol | 4-Carbethoxysaligenin. |
| 9 | p-Formylphenol | 4-Formylsaligenin. |
| 10 | p-Propionylphenol | 4-Propionylsaligenin. |
| 11 | p-Carboxyphenol | 4-Carboxysaligenin, sodium salt. |
| 12 | p-Acetamidophenol | 4-Acetamidosaligenin. |
| 13 | p-Resorcinol | 3- (and 5-)Hydroxysaligenins (mixture). |
| 14 | p-Sulfophenol | 4-Sulfosaligenin, sodium salt. |
| 15 | Phenol | Phenol-CH₂O resin, "A" stage. |
| 16 | p-Chlorophenol | p-Chlorophenol-CH₂O resin, "A" stage. |

Saligenin No. 15 was a commercial phenolformaldehyde resin in the "A" or water-soluble stage. Saligenin No. 16 was the corresponding resin prepared from p-chlorophenol and formaldehyde.

*Example 9*

The saligenins of Example 8 were condensed with ordinary (untreated) tall oil rosin, this being the rosin most prone to crystallize. The condensations were performed by the method of Example 2. The amounts of the saligenins taken being shown in the table below. Generally the saligenins were added in alcohol solution to facilitate mixing with the molten rosin before reaction. The modified rosins thus prepared were tested for their tendency to crystallize by the method of Example 2, it being known that compounds which are effective for stabilizing rosin against crystallization are likewise effective as agents inhibiting crystallization of liquid rosin size. Results are as follows.

| No.[1] | Ring Substituent | Mols[2] | Percent Crystallization[3] |
|---|---|---|---|
|  | Control (untreated rosin) |  | 100 |
| 6 | —Cl | 0.12 | 0 |
| 7 | —OCH₃ | 0.12 | 0 |
| 8 | —COOCH₂H₅ | 0.12 | 5 |
| 9 | —COH | 0.18 | 10 |
| 10 | —COC₂H₅ | 0.18 | 10 |
| 11 | —COONa | 0.24 | 10 |
| 12 | —NH—COCH₃ | 0.24 | 10 |
| 13 | —OH(m) | 0.12 | 0 |
| 14 | —SO₃Na | 0.36 | 10 |
| 15 | Phenol-formaldehyde, "A" stage | 0.36 | 0 |
| 16 | Phenol-formaldehyde, "A" stage chlorinated | 0.36 | 0 |

[1] See Example 8.
[2] Mols saligenin per mol of rosin.
[3] For ratings see Example 2.

*Example 10*

A saligenin of the formula

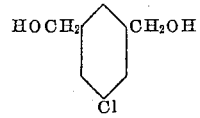

was prepared by reacting one mol of p-chlorophenol, two mols of formaldehyde and 1 mol of NaOH at room temperature in aqueous solution. The sodium salt of the desired compound crystallized on standing which was filtered off, recrystallized from alcohol, and acidified to form the free saligenin.

*Example 11*

A saligenin of the formula

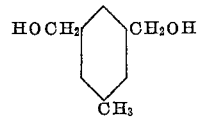

was prepared according to the method of Example 10 except that p-cresol was used as the parent phenol.

*Example 12*

The saligenins of Examples 10 and 11 were tested as anti-crystallization agents for ordinary tall oil rosin, 0.12 mol of the saligenin being used per mol of rosin. The test method of Example 2 was employed. No crystallization of the rosins occurred.

The results of Examples 8–12 show that the effect of substituent groups is minor compared with the effect of the adjacent hydroxy-hydroxymethyl (saligenin) grouping, and therefore that such groups are not principal features of the invention.

The results of Examples 8–12 show that the effect of substituent groups such as chloromethoxy, carbethoxy, etc. is minor compared to the effect of the combined hydroxy-hydroxymethyl (saligenin) grouping, and that the presence of chloro, methoxy, carbethoxy, etc. substituent groups is not a principal feature of the invention.

I claim:

1. A rosin stabilized against crystallization by a uniformly distributed small amount of the condensation product of a rosin with a saligenin, said saligenin being an aryl compound carrying a hydroxy group and a hydroxymethyl group in adjacent position.

2. A rosin stabilized against crystallization by a uniformly distributed small amount of the condensation product of a rosin with a material selected from the group consisting of saligenin, the mono and di alkyl saligenins, and mixtures thereof.

3. A composition according to claim 2 wherein the rosin stabilized against crystallization is a tall oil rosin.

4. A composition according to claim 2 wherein the rosin is a fortified rosin stabilized against crystallization.

5. A composition according to claim 2 wherein the saligenin is the condensation product of 1 mol of phenol with about 1–1.2 mols of formaldehyde.

6. A liquid rosin size stabilized against crystallization by a uniformly distributed small amount of the condensation product of a rosin with a material selected from the group consisting of the saligenins and the alkali metal salts thereof, said saligenins being aryl compounds each carrying a hydroxy group and a hydroxymethyl group in adjacent position.

7. A liquid rosin size stabilized against crystallization by a uniformly distributed small amount of the condensation product of a rosin with a material selected from the group consisting of saligenin, the mono and di alkyl saligenins, mixtures thereof, and alkali metal salts thereof.

8. A liquid tall oil rosin size according to claim 7.

9. A fortified rosin size according to claim 7.

10. A liquid size according to claim 7, wherein the saligenin is the condensation product of 1 mol of phenol with 1–1.2 mols of formaldehyde.

11. A process for stabilizing a rosin against crystallization which comprises condensing said rosin with a small but effective amount therefor of a saligenin, said saligenin being an aryl compound carrying a hydroxy group and a hydroxymethyl group in adjacent position.

12. A process for stabilizing a rosin against crystallization which comprises condensing said rosin with a small but effective amount therefor of a material selected from the group consisting of saligenin, the mono and di alkyl saligenins, and mixtures thereof.

13. A process according to claim 12 wherein the rosin is tall oil rosin.

14. A process according to claim 12 wherein the rosin is fortified rosin.

15. A process for manufacturing a liquid rosin size stabilized against crystallization which comprises condensing a rosin with a small but effective amount therefor of a saligenin, and neutralizing the thus reacted rosin with an aqueous alkali metal alkali solution, said saligenin being an aryl compound carrying a hydroxy group and a hydroxy methyl group in adjacent position.

16. A process for manufacturing a liquid rosin size stabilized against crystallization which comprises condensing a rosin with a small but effective amount therefor of a material selected from the group consisting of saligenin, the mono and di alkyl saligenins, and mixtures thereof, and neutralizing the thus reacted rosin with an aqueous alkali metal alkali solution.

17. A process according to claim 16 wherein the rosin is tall oil rosin.

18. A process according to claim 16 wherein the rosin is fortified rosin.

References Cited in the file of this patent

UNITED STATES PATENTS

| | | |
|---|---|---|
| 2,022,456 | Binapfl | Nov. 26, 1935 |
| 2,186,406 | Dent et al. | Jan. 9, 1940 |
| 2,275,986 | Osterhof | Mar. 10, 1942 |
| 2,309,346 | Landes et al. | Jan. 26, 1943 |
| 2,576,094 | Barthel | Nov. 27, 1951 |

OTHER REFERENCES

Chem. Abst., vol. 30, p. 1625[3] (1936).